US006951320B2

(12) United States Patent
Buchs et al.

(10) Patent No.: US 6,951,320 B2
(45) Date of Patent: Oct. 4, 2005

(54) LOCK MECHANISM FOR SECURING A DOOR KINEMATICS SYSTEM AND PROCESS OF OPERATING SAME

(75) Inventors: Wolfgang Buchs, Oberndorf (DE); Thangaraju Nithyanandam, Donauwoerth (DE); Holger Schreitmueller, Harburg (DE)

(73) Assignee: Eurocopter Deutschland, Donauwoerth (DE)

( * ) Notice: Subject to any disclaimer, the term of this patent is extended or adjusted under 35 U.S.C. 154(b) by 65 days.

(21) Appl. No.: 10/446,134

(22) Filed: May 28, 2003

(65) Prior Publication Data

US 2004/0004159 A1 Jan. 8, 2004

(30) Foreign Application Priority Data

May 29, 2002 (DE) ........................................ 102 23 902

(51) Int. Cl.$^{7}$ .................................................. B64C 1/14

(52) U.S. Cl. ...................................... 244/129.5; 49/394

(58) Field of Search ........................... 244/129.4, 129.5, 244/117 R, 129.1; 49/394; 292/144, 201, DIG. 26

(56) References Cited

U.S. PATENT DOCUMENTS 4,915,326 A * 4/1990 Plude ...................... 244/129.5
5,474,338 A 12/1995 Buescher
5,636,814 A * 6/1997 Rollert .................... 244/129.5
5,803,404 A * 9/1998 Petrou et al. ............ 244/129.5
6,158,692 A * 12/2000 Abild et al. ............. 244/129.5

FOREIGN PATENT DOCUMENTS

DE 4334522 C1 1/1995
EP 0321994 A2 6/1989
EP 0321994 A2 * 6/1989 ............ B64C/1/14
WO WO 84/01404 4/1984

OTHER PUBLICATIONS

Copy of European Office Action dated Sep. 17, 2004 in connection with EP 03 010 526.6.

English translation.

* cited by examiner

*Primary Examiner*—Michael J. Carone
*Assistant Examiner*—Timothy D Collins
(74) *Attorney, Agent, or Firm*—Crowell & Moring LLP

(57) ABSTRACT

A device for locking a door kinematics system of the door of an airplane includes a control unit, an actuator for actuating a locking system and an automatic reset device. The control unit actuates the actuator as a function of the existence of a predetermined signal so that the actuator brings the locking system in a locking position. The reset device, if required, brings the locking system autonomously into a release position.

22 Claims, 5 Drawing Sheets

LOCK MECHANISM FOR SECURING A DOOR KINEMATICS SYSTEM AND PROCESS OF OPERATING SAME

This application claims the priority of German application 102 23 902.9, filed May 29, 2002, the disclosure of which is expressly incorporated by reference herein.

BACKGROUND AND SUMMARY OF THE INVENTION

The present invention relates to a lock mechanism for securing a door kinematics system of an airplane door.

Over the last few years the number of incidents in which unauthorized passengers have tried to get outside a plane during flight and to open a door of the airplane has risen. If such a passenger should succeed in opening a door, this would have catastrophic consequences because the deploying evacuation slide on the airplane could cause it to crash or the sudden drop in cabin pressure could hurl the staff and passengers out of the airplane.

In this respect the necessity exists for a lock mechanism so as to secure doors of the airplane against unauthorized opening.

It is, therefore, an object of the present invention to make a lock mechanism for securing a door kinematics system of an airplane door available, which with a simple design and simple, inexpensive production can safely lock an airplane door and if required, particularly in case of an emergency, can release the locked state of the door.

This object is achieved with a lock mechanism comprising a control unit, an actuator for actuating a locking system and an automatic reset device. The lock mechanism is furthermore designed in such a way that the control unit actuates the actuator as a function of the existence of a predetermined signal in order to bring the locking system into the locked position. When required, especially in case of an emergency, the automatic reset device returns the locking system autonomously into a released state so that the airplane door can be opened from the inside. Furthermore, the automatic reset device ensures that, for example upon failure of an individual component of the lock mechanism, the lock mechanism is also returned into the unlocked state so as to allow actuation of the door kinematics system for opening the door.

Beneficially the lock mechanism comprises a rotatory actuator. The use of a rotatory actuator hereby offers a high level of operational reliability while requiring little space, especially when it comes to locking a door during flight. A brushless DC motor is preferably used as the rotatory actuator. Such a motor is compact, requires only a little space and has a low weight. Furthermore, such motors are largely maintenance-free and exhibit a high level of reliability. Another possibility for a rotatory actuator is the use of a driving mechanism with a solenoid, with which an inexpensive driving mechanism can be made available; however, this rotary actuator has a higher weight and greater space requirement than a DC motor.

In a particularly preferred design, the predetermined signal, as a function of which the control unit actuates the actuator, is a “flight” signal of the airplane. In this way, it can be ensured that the lock mechanism always automatically locks the door kinematics system during flight.

Another preferred possibility for making the predetermined signal available is to equip the system with a switch, for example in the cockpit, wherein the predetermined signal is generated upon actuation of the switch and the lock mechanism locks the door kinematics system. Such a switch can for example also be used for maintenance purposes or for checking the function of the lock mechanism on the ground.

So as to enable a reduction in the input speed of the actuator, the lock mechanism furthermore preferably contains a transmission, especially a planetary gear system.

The automatic reset device preferably contains a spring element, which allows a particularly inexpensive lock mechanism to be made available. In an even more preferred design the automatic reset device comprises at least two spring elements, which each are able individually to reset the locking system from the locked position into the released position. In this way, a redundancy of the reset device is enabled, compensating even for the failure of a spring element, and even greater safety is achieved for cases where the locking system has to be reset in cases of emergency. The spring elements are preferably prestressed by bringing the locking system in the locked position. In this way, the reset device is always automatically transferred into its tensioned state when the door kinematics system becomes locked.

The spring resistance of the spring element is preferably selected in such a way that the spring element is in a position to bring the locking system into the released position from the locking position within just a few seconds.

Furthermore, it is preferred that the rotatory actuator is designed in such a way that it, when switched current-less, also acts as a brake when the locking system is returned from the locked position into the released position. This enables a damped resetting of the locking system.

The locking system beneficially comprises a hook and a brace element with a recess, in which the hook engages in the locked state and thus blocks the door kinematics system. In order to prevent mechanical stress from being applied on the locking system during the locked state, a separate stop element is preferably provided, which establishes a starting and/or ending position without applying stress on the hook itself.

The control unit preferably selects the actuator such that the speed is reduced when approaching the stop in order to achieve gentler stopping.

Pursuant to another preferred design of the present invention, the control unit selects the actuator such that with a suitable signal the locking system is actively pushed in the release direction.

The invented lock mechanism is suitable especially also for retrofitting airplanes that are already being used with appropriate modifications. Since the invented lock mechanism has a very light and compact design, it can generally be installed without difficulty between doorframe segments of the door.

The following is a description of the present invention based on a preferred exemplary design shown in the drawings.

DETAILED DESCRIPTION OF THE INVENTION

Figure 1:
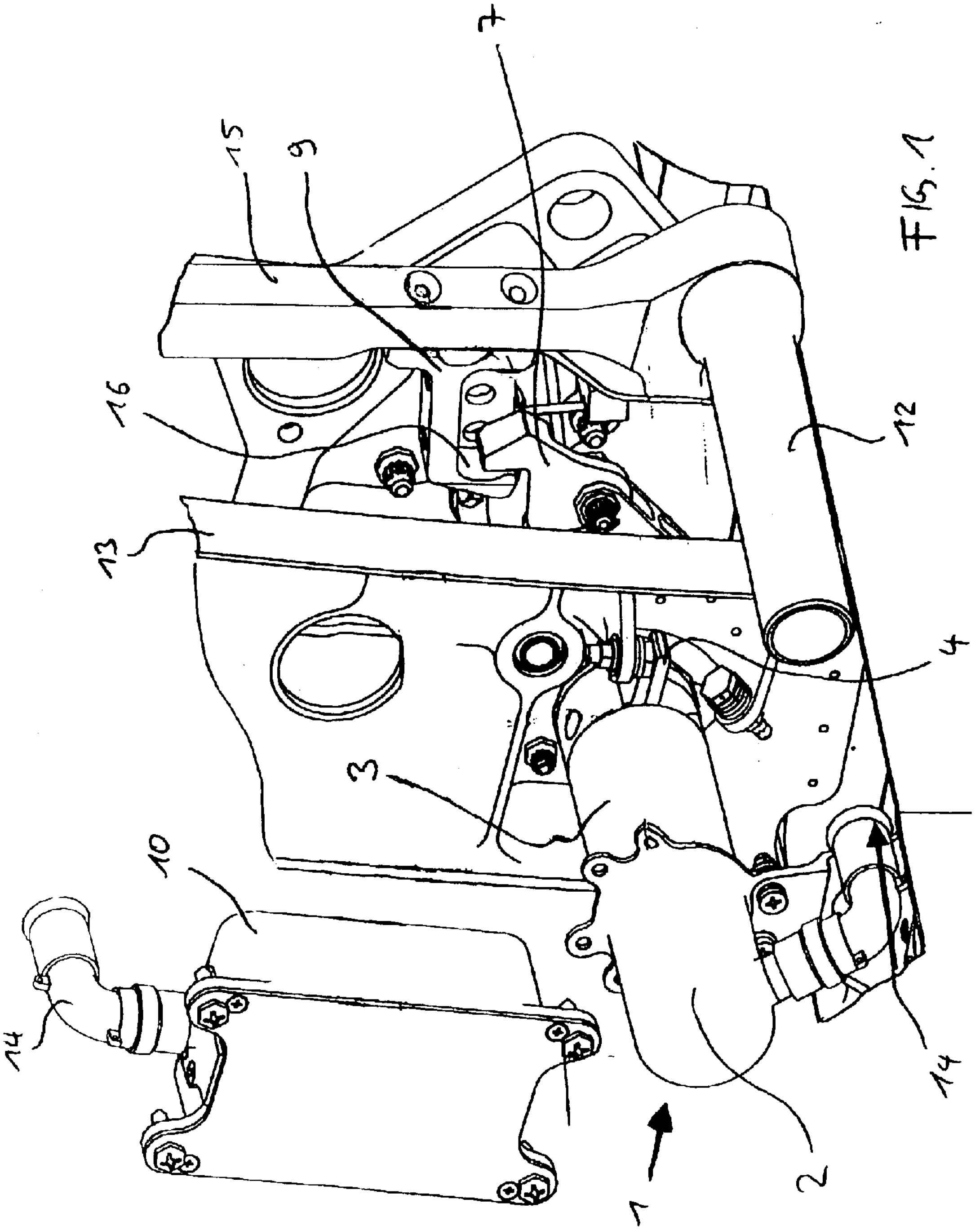
FIG. 1 is a diagrammatic perspective view of a lock mechanism pursuant to an embodiment of the invention in the locked state.
Figure 2:
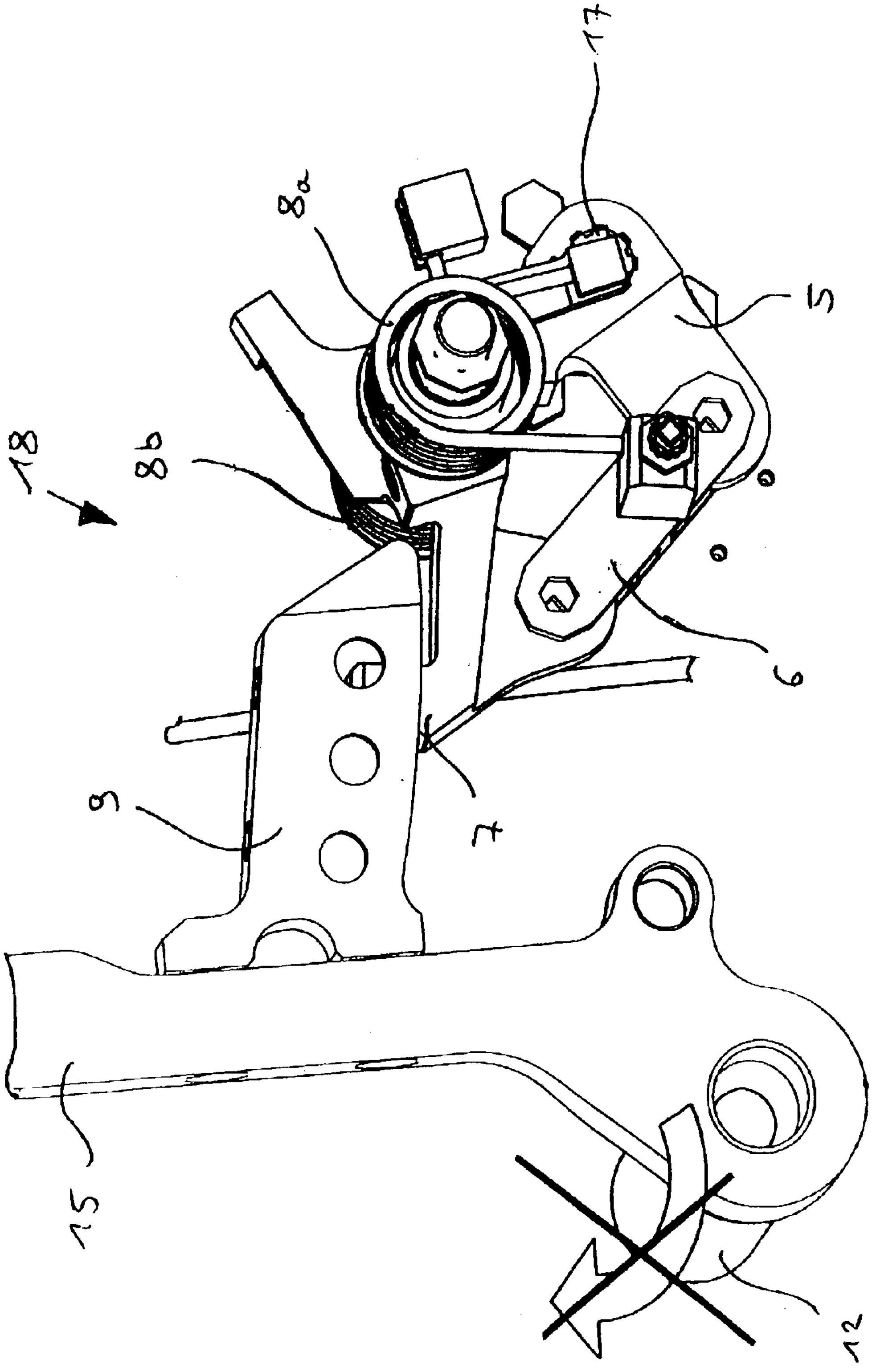
FIG. 2 is a diagrammatic perspective view of the locking system in the locked state from the side opposite to that of FIG. 1.
Figure 3:
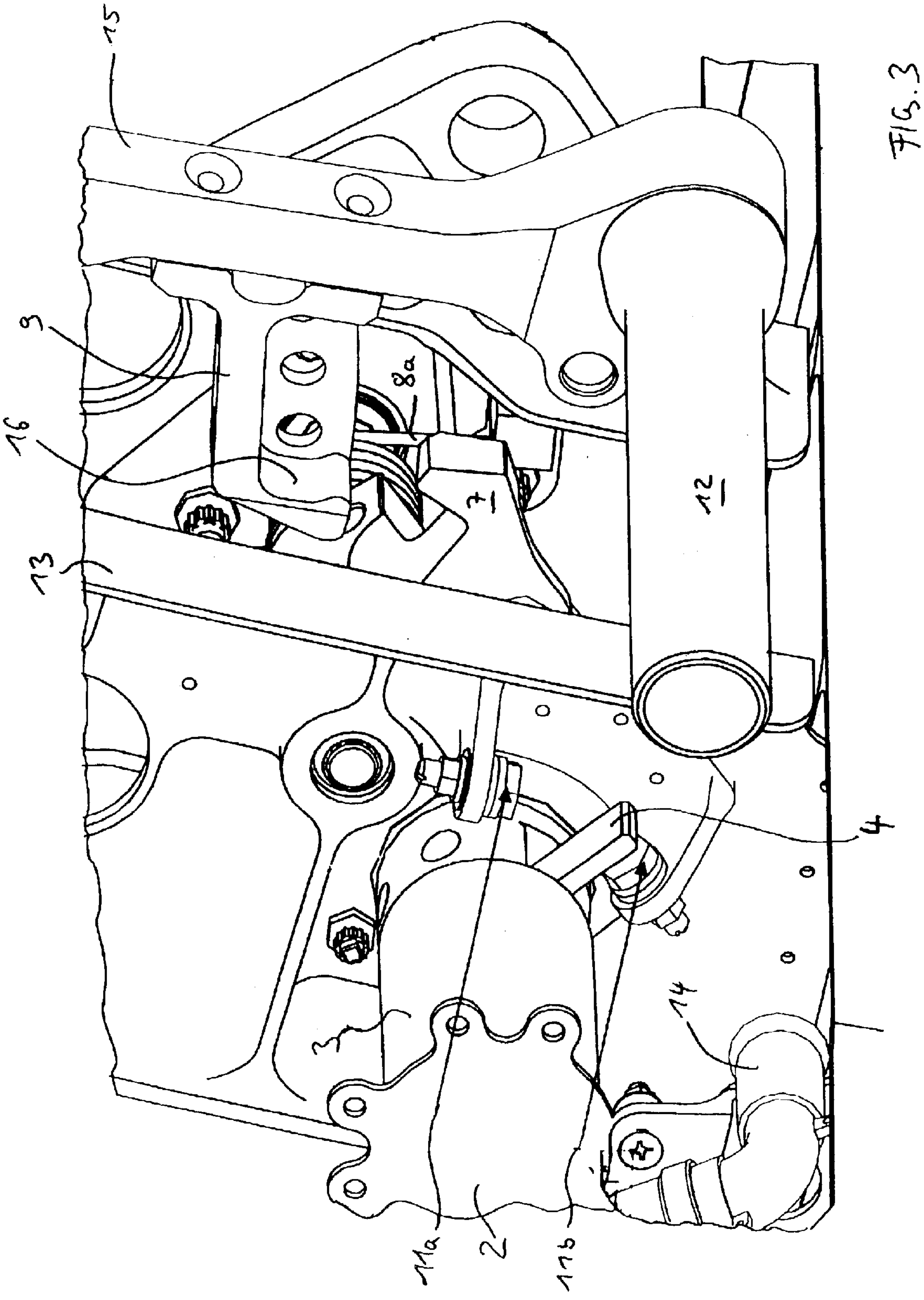
FIG. 3 is a diagrammatic perspective view of the lock mechanism in the unlocked state, FIG. 4 a diagrammatic perspective view of the locking system in the unlocked state from the side opposite to that of FIG. 3.
Figure 4:
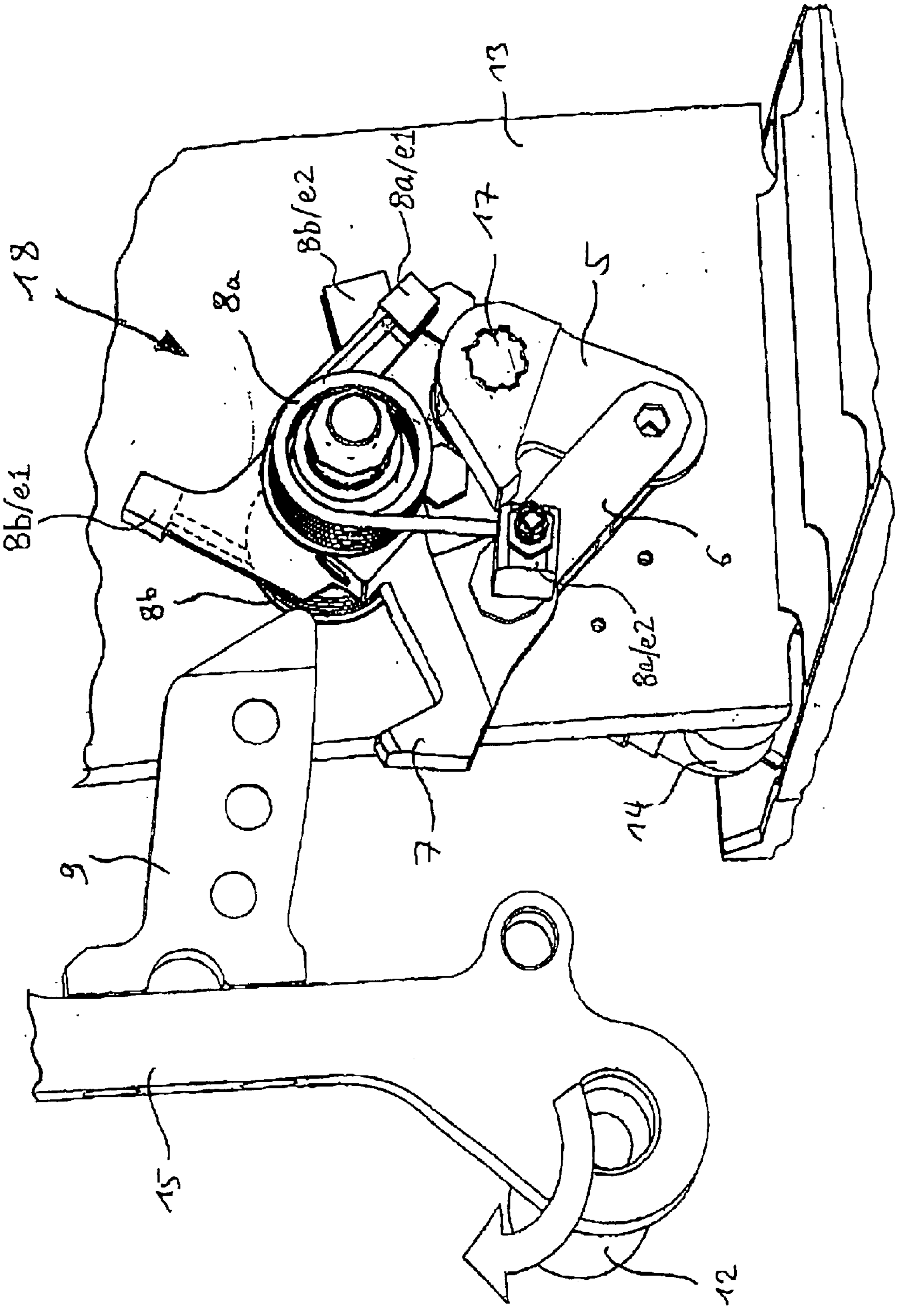

FIGS. 1 through 5 depict a lock mechanism pursuant to an exemplary design of the present invention. FIGS. 1 and 2 show the locked state of the lock mechanism, and FIGS. 3 and 4 show the released state of the lock mechanism.

As can be seen particularly in FIG. 1, the lock mechanism pursuant to the invention comprises a control unit 10, which is connected with an actuator 1 via a cable 14. The actuator 1 is a rotatory actuator, comprising a brushless DC motor 2, which drives an output shaft 17. The DC motor 2 is connected via a reducing planetary gear 3 with a locking system or a locking kinematics system 18, comprising an actuator lever 5, a connecting element 6, a hook 7, two springs 8*a*, 8*b* and a brace 9 (see in particular FIGS. 2 and 4). In the locked state, the hook 7 engages in a recess 16 incorporated in the brace 9 with undercut (see FIG. 1). The brace 9 is hereby attached on an interior door lever 15 (indicated only diagrammatically), which can be actuated manually via a handle roller 12 in order to open the airplane door in the familiar fashion.

The lock mechanism furthermore comprises a stop mechanism, having a first stop 11*a*, a second stop 11*b* and a lever 4 (see FIG. 3). The lever 4 is connected with the output shaft 17 of the transmission 3 and thus limits the path of motion of the hook 7. The stop mechanism prevents the hook 7 from being pushed against the brace 9 under load and possibly being damaged.

Two spiral springs 8*a* and 8*b*, provided as the automatic reset device, are tensioned into the locked position with the movement of the locking system. This state is shown in FIG. 2. In the released state, the springs 8*a*, 8*b* are also released to their specified pre-stress. The restoring force of the springs 8*a* and 8*b* is such that they individually are in a position to reset the locking system autonomously from any position into the released state. Thus, a redundant automatic reset device is provided.

As can be seen particularly in FIG. 1, the lock mechanism pursuant to the invention can be mounted between two doorframe segments 13 of the airplane door.

A function of the invented lock mechanism of the design is as follows. When the airplane lifts off the ground, automatically, a so-called "flight" signal is generated, which indicates the flying state of the airplane. This signal is supplied to the control unit 10, which controls the lock mechanism 1. Based on the "flight" signal, the control device 10 controls the actuator 1 by means of electric signals via the line 14 in such a manner that the DC motor 2 drives the output shaft in a controlled fashion by limiting its tension range. The speed of the output shaft is reduced in the planetary gear 3. The output shaft 17 of the planetary gear is connected with the actuator lever 5 by means of a toothed area. The hook 7, proceeding from the position shown in FIGS. 3 and 4, is thus moved upward in the direction of the recess 16 via the actuator lever 5 and the connecting element 6. As FIG. 3 shows, in the starting position of the lock mechanism, the lever 4 rests against the second stop 1*b*. The hook is turned upward until the lever 4 stops against the first stop 11*a* (FIG. 1). This arranges the hook 7 in the recess 16 of the brace 9, without creating a contact between the hook 7 and the brace 9. The lock mechanism is hereby brought into its locked position.

If a passenger should now try to pull the interior door lever 15 by means of the handle roller 12, the hook 7 prevents the unlocking and unlatching of the door kinematics system.

It shall be noted that when the hook 7 arrives in its final position (i.e. the lever 4 rests against the first stop 11*a*), the control unit 10 shuts off the electronic commutation required for turning the actuator through the detection of a current impulse and introduces constant current into the motor. This prevents the motor from overheating at the limit stop, and the requirement for electric energy for maintaining the position of the hook 7 in the locked state is minimized. Furthermore, the detection of the current impulse enables an automatic adjustment of the actuator's path of motion on the stop to be achieved. In this way, a limit position sensor can be foregone.

When the "flight" signal is not detected, for example, when the airplane is on the ground or in case of a power failure in an emergency situation, the motor 2 is switched currentless and the hook 7 is set back into its starting position through the restoring force of the two springs 8*a*, 8*b* so that the interior door lever 15 is released and can be actuated to open the door. In this way, it is possible to actuate the interior door lever 15 in the direction of the arrow in FIG. 4.

The motor 2 functions as a brake by short-circuiting the motor coils via a brake resistance and thus prevents a hard stop.

Figure 5:
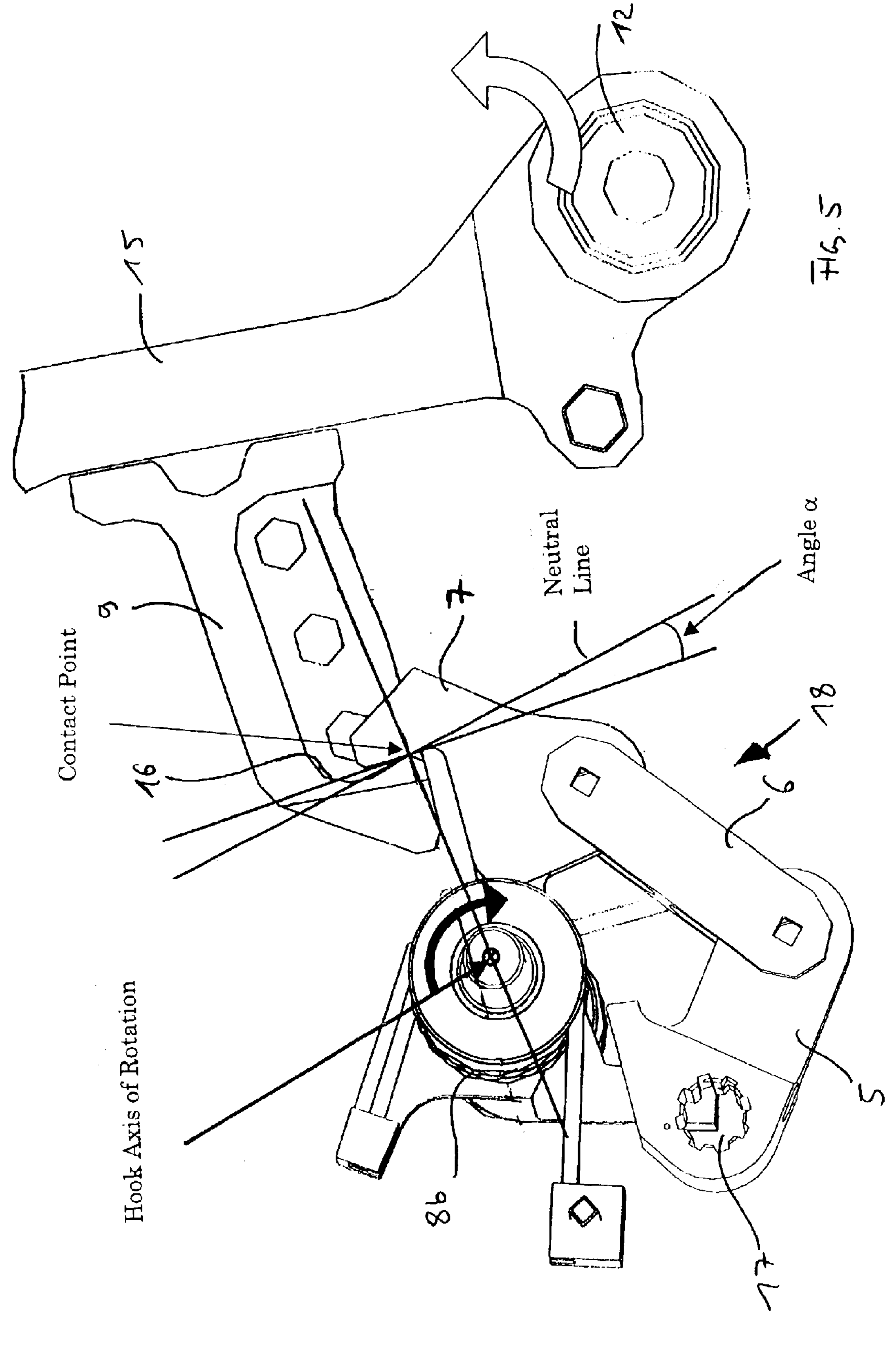
FIG. 5 is a diagrammatic depiction of an opening process of the lock mechanism.

As shown in the detailed, diagrammatic depiction of FIG. 5, the geometry of the contact surfaces between hook 7 and recess 16 are designed through a tapered tangent such that, in the currentless case, an opening torque onto the hook 7 is generated through manual forces on the handle roller 12 even in the case of a sluggishness of the locking system 18. When current is applied, this opening torque is overcompensated by the holding torque of the actuator.

The lock mechanism pursuant to the invention is, therefore, designed in such a way that, even in the case of failure of one of the components of the lock mechanism (e.g. failure of the motor, mechanical breakage of a component), the reset device can release the lock mechanism autonomously so that the possibility of opening the door manually in an emergency is always guaranteed. By selecting the rotatory actuator 1, a safe state (released state) can be achieved with a high level of reliability even when an individual element of the lock mechanism fails. Furthermore, the electromechanical lock mechanism exhibits great reliability, even when maintaining the locked position, while having a low weight and low manufacturing and assembly costs. Due to the compact design, it is also easily possible to retrofit the invented lock mechanism for airplanes that are already being used.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. A lock mechanism for locking a door kinematics system of a door of an airplane, comprising:

a control unit, an actuator including a rotable output shaft and a motor which rotates the output shaft for actuating a locking system, an automatic reset device, and a stop mechanism including a lever connected with and rotatable about an axis of the output shaft, and first and second stops between which the lever is rotatable, wherein the control unit is adapted to actuate the actuator as a function of existence of a predetermined signal so that the actuator can bring the locking system into a locked position determined by the first stop of the stop mechanism, and wherein the reset device is adapted to bring the locking system autonomously into a released position determined by the second stop of the stop mechanism.

2. The lock mechanism according to claim 1, wherein the actuator comprises a brushless DC motor.

3. The lock mechanism according to claim 1, wherein the predetermined signal is a "flight" signal of the airplane.

4. The lock mechanism according to claim 1, and further comprising a transmission for reducing an input speed.

5. The lock mechanism according to claim 1, wherein the automatic reset device is designed as a spring element.

6. The lock mechanism according to claim 5, wherein the automatic reset device comprises at least two spring elements, and wherein each of the spring elements individually is in a position to bring the locking system from the locked position into the released position.

7. The lock mechanism according to claim 5, wherein the spring element is tensioned when the locking system is brought into the locked position.

8. The lock mechanism according to claim 5, wherein the spring element has such a restoring force that the looking system can be brought from any position into the released position within a matter of a few seconds.

9. The lock mechanism according to claim 1, wherein the actuator acts as a braking device for decreasing speed during release of the lock mechanism.

10. The lock mechanism according to claim 1, wherein the locking system comprises a hook and a brace element with a recess, and wherein the hook engages in the recess and blocks the door kinematics system when the locking system is in the locked position.

11. The lock mechanism according to claim 1, wherein the control unit controls the actuator such that speed is reduced upon approaching at least one of the first and second stops.

12. The lock mechanism according to claim 1, wherein the control unit controls the actuator such that, in the case of a suitable signal, the locking system is actively pushed in a release direction.

13. The lock mechanism according to claim 4, wherein the transmission is a planetary gear mechanism.

14. The lock mechanism according to claim 6, wherein each of the at least two spring elements is tensioned when the locking system is brought into the locked position.

15. A process of operating a lock mechanism for locking a door kinematics system of a door of an airplane having a control unit, an actuator for actuating a locking system, and an automatic reset device, comprising:

actuating the actuator with the control unit as a function of existence of a predetermined signal so that rotation of an output shaft of the actuator brings the locking system into a locked position, limiting rotation of the output shaft as the locking system is brought into the locked position which is determined by way of a lever, connected with and rotatable about an axis of the output shaft, and first stop of a stop mechanism, autonomously bringing the locking system into a released position with the reset device, and limiting rotation of the output shaft as the locking system is brought into the released position which is determined by way of the lever and a second stop of the stop mechanism.

16. The process according to claim 15, and further comprising decreasing speed during release of the lock mechanism.

17. The process according to claim 15, and further comprising reducing the speed upon approaching at least one of the locked and released positions.

18. The lock mechanism according to claim 10, wherein the hook is arranged in the recess without creating contact between the hook and the brace element when the locking system is in the locked position.

19. The process according to claim 15, wherein the locking system comprises a hook and a brace element with a recess, and wherein the hook engages in the recess and blocks the door kinematics system when the locking system is in the locked position.

20. The process according to claim 19, wherein the hook is arranged in the recess without creating contact between the hook and the brace element when the locking system is in the locked position.

21. The lock mechanism according to claim 18, wherein the hook and the recess are provided with contact surfaces producing an opening torque on the hook in the absence of current supply to the motor.

22. The process according to claim 20, wherein the hook and end the recess are provided with contact surfaces producing an opening torque on the hook in the absence of current supply to the motor.

* * * * *